United States Patent
Joppe et al.

(10) Patent No.: US 8,360,763 B2
(45) Date of Patent: Jan. 29, 2013

(54) BLOWN FILM EXTRUSION DEVICE

(75) Inventors: Markus Joppe, Ibbenbüren (DE); Werner Hülsmeier, Lengerich (DE)

(73) Assignee: Windmoeller & Hoelscher KG, Lengerich (DE)

( * ) Notice: Subject to any disclaimer, the term of this patent is extended or adjusted under 35 U.S.C. 154(b) by 470 days.

(21) Appl. No.: 12/310,361

(22) PCT Filed: Aug. 15, 2007

(86) PCT No.: PCT/EP2007/007285
§ 371 (c)(1), (2), (4) Date: Feb. 23, 2009

(87) PCT Pub. No.: WO2008/022749
PCT Pub. Date: Feb. 28, 2008

(65) Prior Publication Data
US 2009/0252819 A1    Oct. 8, 2009

(30) Foreign Application Priority Data
Aug. 23, 2006   (DE) .......................... 10 2006 039 563

(51) Int. Cl.
*B29C 47/20* (2006.01)
*B29C 47/88* (2006.01)

(52) U.S. Cl. .................. 425/72.1; 425/192 R; 425/380; 425/467

(58) Field of Classification Search .................. 425/72.1, 425/192 R, 380, 467
See application file for complete search history.

(56) References Cited

U.S. PATENT DOCUMENTS

| | | | | |
|---|---|---|---|---|
| 4,145,177 A | * | 3/1979 | Schott, Jr. | ...................... 425/445 |
| 4,678,417 A | * | 7/1987 | Upmeier | ...................... 425/72.1 |
| 6,783,344 B1 | * | 8/2004 | Rudolf | ...................... 425/72.1 |

FOREIGN PATENT DOCUMENTS

| | | |
|---|---|---|
| DE | 78 368 A | 12/1970 |
| DE | 33 36 181 A1 | 4/1985 |
| DE | 92 14 647 U1 | 3/1993 |
| EP | 0 595 037 A1 | 5/1994 |
| JP | 01 024725 A | 1/1989 |

OTHER PUBLICATIONS

Transalation of DE 3336181, USPTO/P/OPIM/STIC/EIC-Division/Translations Branch, Mar. 30, 2012.*

* cited by examiner

*Primary Examiner* — Yogendra Gupta
*Assistant Examiner* — Joseph Leyson
(74) *Attorney, Agent, or Firm* — Jacobson Holman PLLC

(57) ABSTRACT

A blown film extrusion device includes a blow head and an outer cooling ring mountable on a top of the blow head. The cooling ring has an annular support surface on its bottom and can be centered relative to the blow head via centering devices.
The centering devices are formed by at least three radially arranged linear guides, each of which has a radially extending recess and at least one guide element engaging in the recess.

13 Claims, 3 Drawing Sheets

BLOWN FILM EXTRUSION DEVICE

CROSS-REFERENCE TO RELATED APPLICATION

This is a national stage of PCT/EP07/007285 filed Aug. 15, 2007 and published in German, which has a priority of Germany no. 10 2006 039 563.8 filed Aug. 23, 2006, hereby incorporated by reference.

BACKGROUND OF THE INVENTION

1. Field of Invention

The invention concerns a blown film extrusion device with a blow head and an external cooling ring mountable on its top, having an annular support surface on its bottom and centerable relative to the blow head via centering devices.

2. Description of the Prior Art

Such a device is known from DE 33 36 181 A1. The so-called blow head has an annular nozzle gap from which plastic melt emerges. Air is blown into the center of the annular nozzle. At the same time air is fed from the outside by means of an external cooling ring against the film tube emerging at the annular nozzle. The external cooling ring is then mounted with an annular surface on its bottom on an annular surface on the top of the blow head so that the external cooling ring can be slightly raised in order to facilitate access to the annular nozzle during maintenance. A problem here is that the already slight eccentricities or oblique positions of the mounted external cooling ring mean that the bubble taken off from the annular nozzle is slanted, which can lead to nonuniform thickness distribution in the film and to problems during further processing.

The centering devices proposed in the known blown film extrusion device are screws, which are aligned on the bottom of the external cooling ring in the radial direction and mounted in a threaded hole. They can be set with their tip against the outer periphery of a circular section in the upper area of the blow head.

Centering occurs in a blown film extrusion device according to DE 92 14 647 U1 through a shoulder with the shape of a truncated cone on the blow head, on which the outer cooling ring is mounted with a conical hole.

It is also known to form centering devices by hook-like angles. The upper edge of the blow head can be enclosed by at least three angles on the bottom of the outer cooling ring so that the centering ring is centered relative to the blow head.

All known blown film extrusion devices have the common feature that their centering devices do not permit temperature-independent centering. Centering of the cooling ring and blow head free of play performed at room temperature is not effective in operation, since the stronger heating of the blow head leads to relatively greater elongation than in the cooling ring. Significant pressure forces would therefore act on the centering devices that are supported on the outer periphery of parts of the blow head. For this reason, centering must be conducted separately at each operating point in the known blown film extrusion devices.

SUMMARY OF THE INVENTION

The task of the invention is therefore to permit temperature-independent centering of the outer cooling ring and blow head.

This task is solved in a blown film die of the type just mentioned in that the centering devices are formed by at least three radially arranged linear guides, each of which includes a radically extending recess and at least one guide element engaging in it.

Because of the radial extent of the linear guides, a different temperature elongation of the two centering parts in the peripheral direction is possible relative to each other. The temperature elongation only leads to a relative shift of the guide elements within the groove in the radial direction.

Owing to the fact that at least three linear guides are formed, forced centering is present regardless of whether the guide elements are arranged on the bottom of the outer cooling ring or on the top of the blow head, so that both arrangements are possible.

A design with four grooves, two each lying on a common diameter line, i.e., flush with each other, simplifies manufacture and increases the accuracy.

To facilitate mounting of the cooling ring on the blow head, self-centering is caused by the fact that the feather key elements are beveled on their radially aligned side edges.

In addition or as an alternative, it is possible to bevel the grooves on their radially aligned side edges so that the feather key elements slide easily into the grooves when mounted.

Instead of feather key elements, pins with a circular cross section can also be provided as guide elements. The advantage of pins is that only linear contact on both flanks of the groove occurs and that heat transfer from the blow head into the corresponding guide element is therefore reduced.

In the blown film extrusion device according to the invention the groove and guide element can be designed with their side dimensions for loose fit, in which the fit is chosen so that even on maximal heating of the blow head during operation as well as simultaneous maximal cooling of the blow head, sliding of the guide elements within the groove is possible in each case and jamming is prevented.

To further improve accuracy of centering in all operating states the following measures are proposed:

There is a possibility of producing the guide elements from a material that has the same heat expansion coefficient as the housing of the joint partner in the area of the groove. At the same time the guide elements are decoupled by thermal insulation from the component to which they are applied. In this case a rectangular shape of the guide element is advantageous, since longer linear contact occurs and the guide element is heated to roughly the same temperature as the groove area in which it engages. Consequently, the groove and guide element expand the same way at the corresponding engagement point so that a correspondingly closer fit can be chosen and therefore higher centering accuracy achieved.

Another possible measure to restrict lateral play consists of configuring the groove either entirely V-shaped or milling out the groove bottom V-shaped and at the same time giving the guide elements a wedge shape on their tip. The reverse arrangement is also possible, in which a V-shaped rib protrudes from the base of the groove, onto which a compatible recess on the tip of the guide element fits. In particular, if the wedge shapes do not agree in angle, a sharply delimited linear contact is achieved so that the radial movement of the guide element is possible without jamming of the guide element in the groove or an oversize in a reverse arrangement, which might lead to inaccuracy.

The invention is further explained below with reference to the drawings.

DETAILED DESCRIPTION OF THE PREFERRED EMBODIMENT

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

Figure 1:
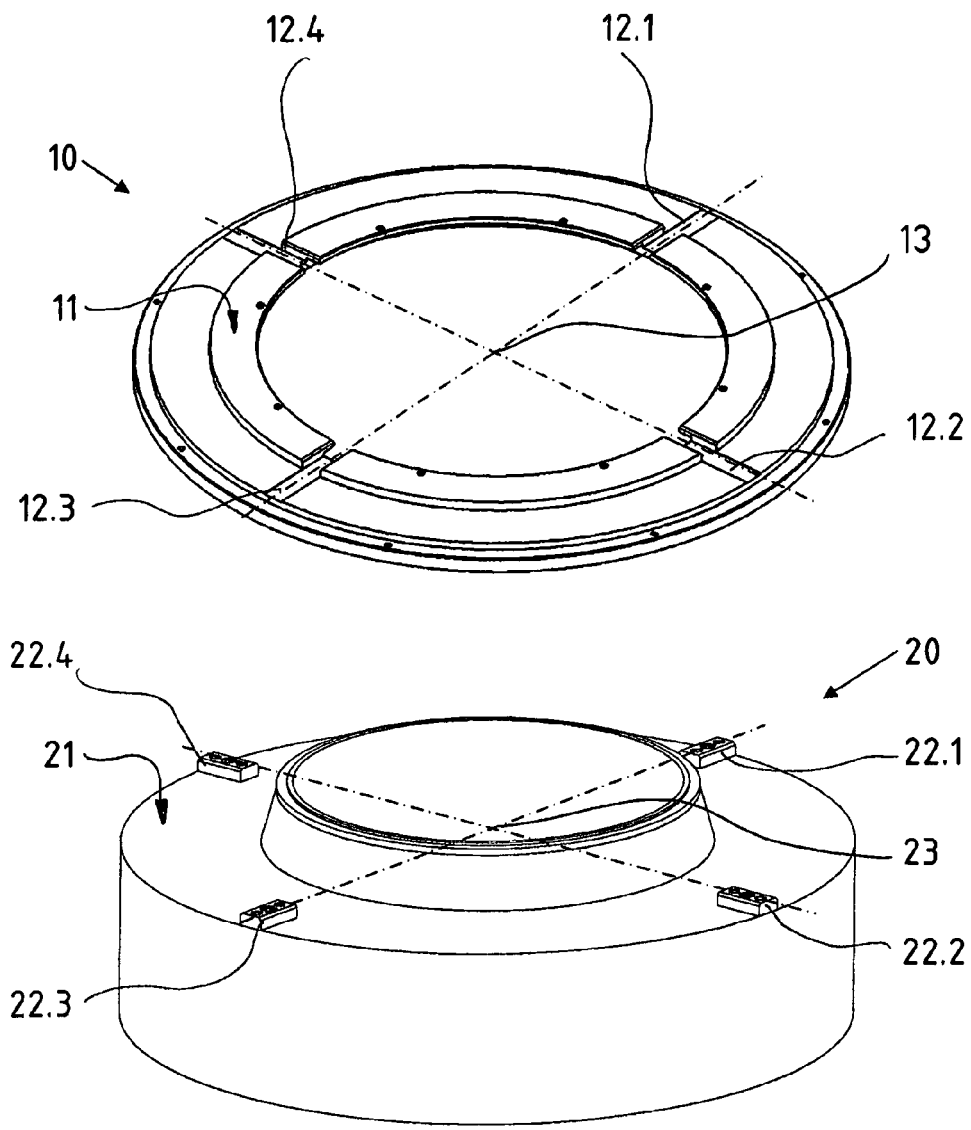
FIG. 1 shows the blown film extrusion device according to the invention in a perspective view.

FIG. 1 shows the necessary base elements of a blown film extrusion device having a cooling ring 10 and a blow head 20. The blow head is shown in the correct position, i.e., with top facing up, whereas the cooling ring 10 mountable on an annular surface 21 on the top of blow head 20 is rotated by 180°, i.e., positioned on the head in order to permit a view of the bottom and the centering elements arranged there.

Four guide elements in the form of feather keys 22.1, ..., 22.4 are arranged on the upward facing and horizontally aligned annular surface 21 on blow head 20, which are aligned exactly radially, as indicated by the dash-dot diameter lines. The center points 13, 23 of the outer cooling ring 10 and blow head 20 to be centered relative to each other lie at the intersection point of the diameter lines.

A circular support surface 11 is present on the bottom of the outer cooling ring 10, in which four grooves 12.1, ... 12.4 are made, which extend precisely radially. Both the guide elements 22.1, ..., 22.4 as well as the grooves 12.1, ..., 12.4 are offset by exactly 90° relative to each other in the depicted practical example.

In order to be able to compensate for manufacturing tolerances, the feather keys (i.e., guide elements) 22.1, ..., 22.4 are initially joined by a screw to the annular surface 21 and then, after exact alignment relative to grooves 12.1, ..., 12.4 by alignment pins are finally fastened in their position relative to annular surface 21.

Figure 2:
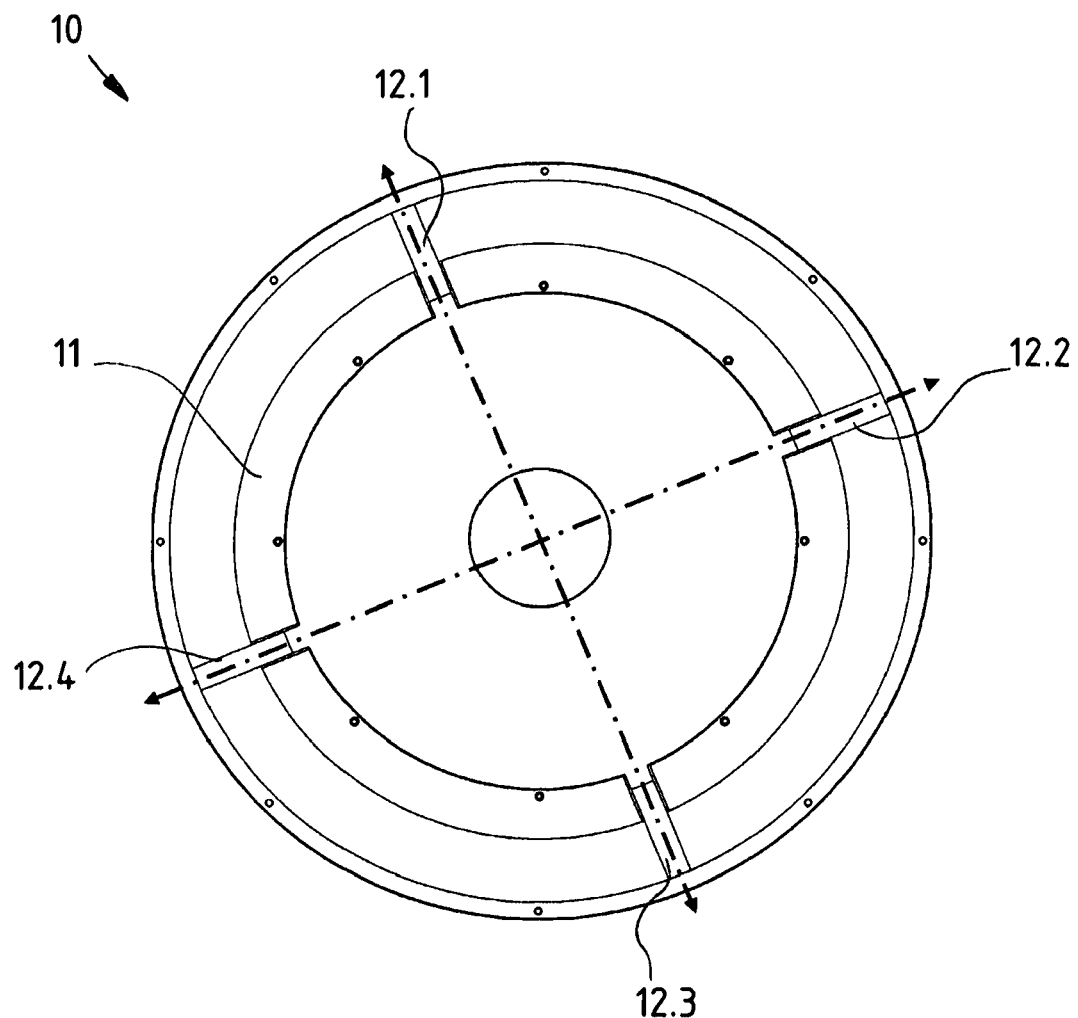
FIG. 2 shows a plan view of the bottom of the outer cooling ring and FIG. 3 shows the blow head and outer cooling ring in a cross-sectional view true to position.

FIG. 2 shows the arrangement of grooves 12.1, ..., 12.4 again in a plan view on the bottom with its annular somewhat raised circular support surface 11. Opposite grooves 12.1, 12.3 and 12.2, 12.4 lie on a diameter line, in which the diameter lines are aligned offset by 90° relative to each other.

Figure 3:
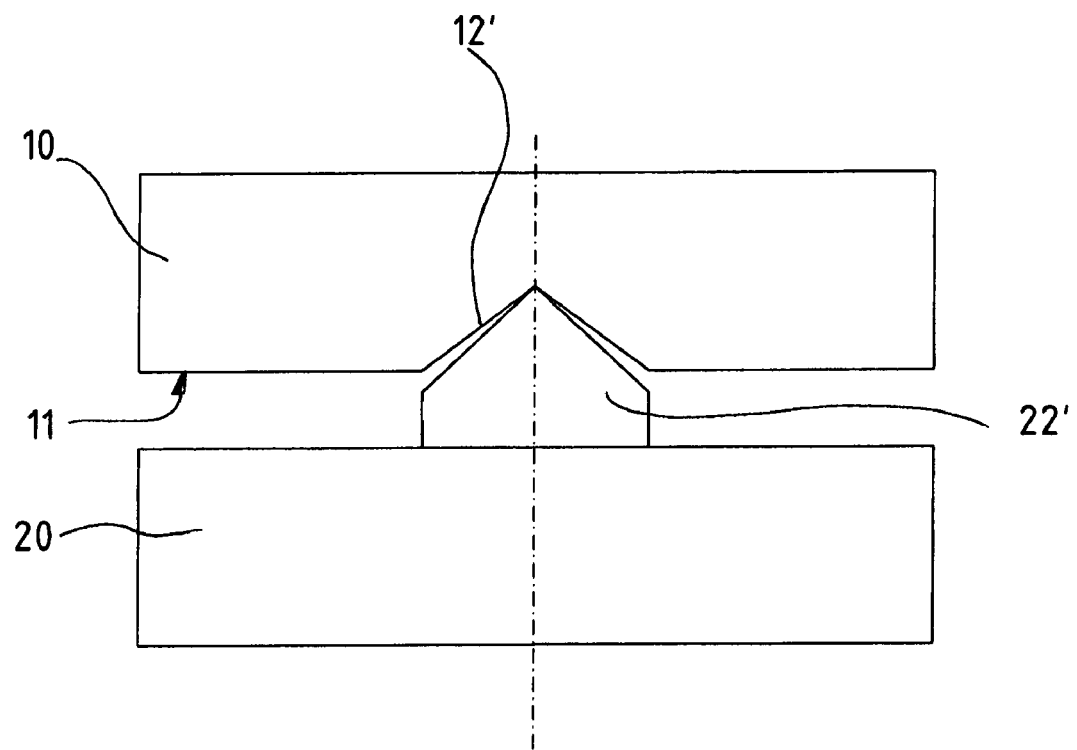

FIG. 3 schematically depicts the view from the outer periphery of an outer cooling ring 10 positioned on blow head 20 in the area of a linear guide. The configuration is formed in the practical example depicted here again by a radially extending recess 12' in the outer cooling ring 10 and by the guide elements 22' protruding from the blow head top. The radially extending recess, i.e., groove, 12' and the guide element 22' are V-shaped or wedge-shaped. The enclosed angle in the convex parts, here the guide elements 22', is smaller than in the concave parts, here the grooves 12', so that linear contact only occurs in the area of the tip.

List of Reference Numbers

10 Outer cooling ring
11 Circular surface
12' Groove
12.1 Groove
12.2 Groove
12.3 Groove
12.4 Groove
13 Centering center point
20 Blow head
21 Annular surface
22' Guide element
22.1 Guide element
22.2 Guide element
22.3 Guide element
22.4 Guide element
23 Centering center point The invention being thus described, it will be apparent that the same may be varied in many ways. Such variations are not to be regarded as a departure from the spirit and scope of the invention, and all such modifications as would be recognized by one skilled in the art are intended to be included within the scope of the following claims.

What is claimed is:

1. A blown film extrusion device comprising:
a blow head and an outer cooling ring mountable on a top of the blow head, the outer cooling ring including on a bottom thereof an annular support surface that is configured to be centered relative to the blow head via centering devices, the centering devices including at least three radially arranged linear guides having (i) a radially extending recess and (ii) at least one guide element configured to engage the recess and allow movement of the guide element relative thereto.

2. The blown film extrusion device according to claim 1, wherein the radially extending recess is a groove on the bottom of the outer cooling ring and the guide element protrudes from the top of the blow head.

3. The blown film extrusion device according to claim 1, wherein the radially extending recess is a groove on the top of the blow head and the guide element protrudes from the bottom of the outer cooling ring.

4. The blown film extrusion device according to claim 2, wherein the guide element is configured as a radially aligned feather key.

5. The blown film extrusion device according to claim 4, wherein the feather key element is beveled on radially aligned side edges thereof.

6. The blown film extrusion device according to claim 2, wherein the guide element is configured as a pin having a circular cross section.

7. The blown film extrusion device according to claim 2, wherein the groove is beveled on radially aligned side edges thereof.

8. The blown film extrusion device according to claim 1, wherein the centering devices include four of the radially arranged linear guides, with two each lying on a common diameter line.

9. The blown film extrusion device according to claim 1, wherein the at least one guide element is configured to be thermally decoupled.

10. The blown film extrusion device according to claim 2, wherein in a section across the radial extent of the grooves, a base of the groove has a recessed V-shape and an outer portion of the guide element has a wedge shape.

11. The blown film extrusion device according to claim 2, wherein in a section across the radial extent of the grooves, a base of the groove includes a V-shaped rib provided thereon and an outer portion of the guide element includes a wedge-shaped groove thereon.

12. The blown film extrusion device according to claim 10, wherein an angle formed by side edges of the wedge-shaped guide element is smaller than an angle formed by side edges of the groove.

13. A blown film extrusion device comprising:

a blow head and an outer cooling ring mountable on a top of the blow head, the outer cooling ring including on a bottom thereof an annular support surface that is configured to be centered relative to the blow head via a plurality of centering devices, each of the centering devices including a radially arranged linear guide having (i) a radially extending groove-shaped recess with a V-shape and (ii) a corresponding wedge-shaped guide element configured to engage the recess, an angle formed by side edges of the wedge-shaped guide element being smaller than an angle formed by side edges of the groove-shaped recess.

* * * * *